Nov. 24, 1942.　　W. H. TAYLOR　　2,303,145
ENGINE VALVE
Filed June 10, 1941　　2 Sheets-Sheet 2
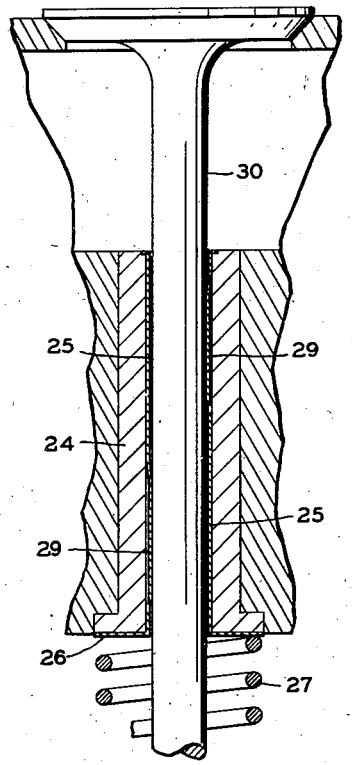
Fig.5
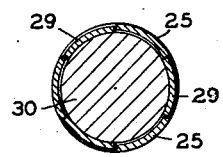
Fig.7
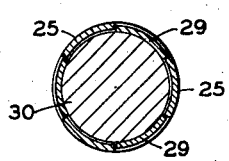
Fig.8
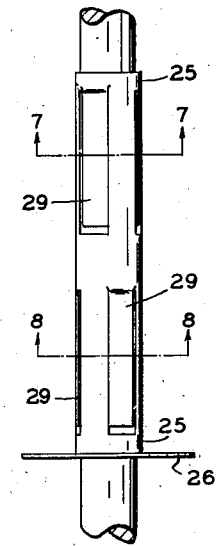
Fig.6
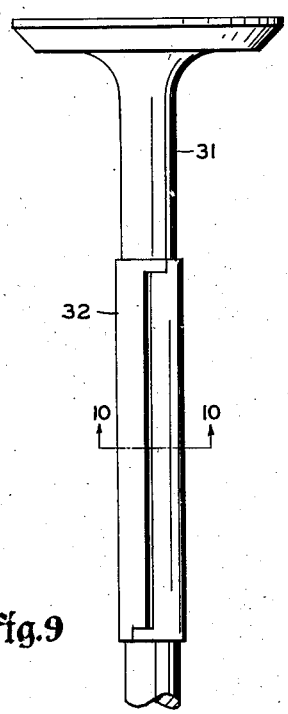
Fig.9
Fig.10
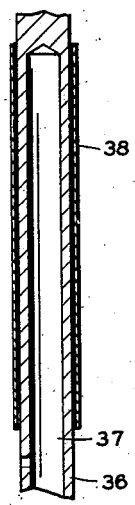
Fig.11
INVENTOR.
WILLIAM H. TAYLOR
BY
HIS ATTORNEY Patented Nov. 24, 1942

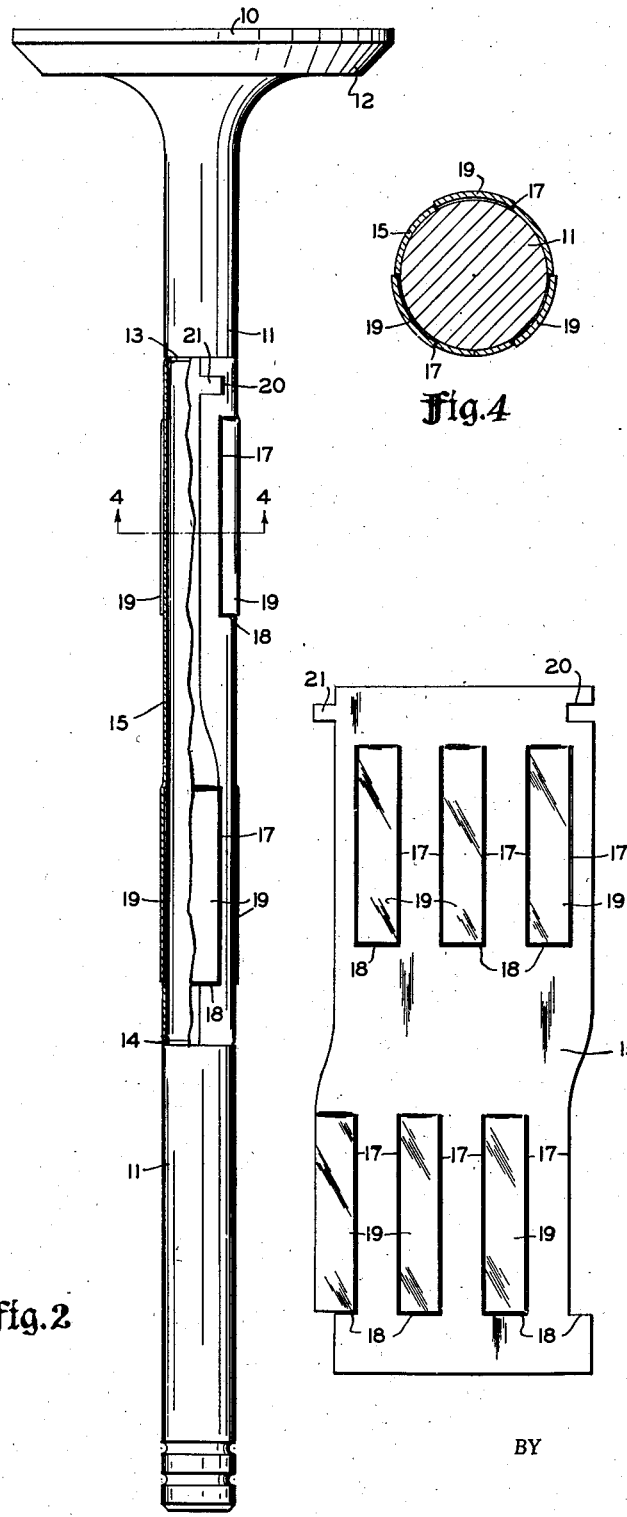

2,303,145

UNITED STATES PATENT OFFICE 2,303,145

ENGINE VALVE

William H. Taylor, Mentor-on-the-Lake, Ohio

Application June 10, 1941, Serial No. 397,501

14 Claims. (Cl. 123—188)

This invention relates to engine valves and more particularly to an improvement in the valve disclosed and broadly claimed in United States Letters Patent No. 1,959,394, issued to me on May 23, 1934.

This application is a division continuation in part fo my copending application, Serial No. 162,155, filed September 2, 1937, now Patent Number 2,270,356, January 20, 1942, and entitled "Valve."

As more fully set forth in my above identified Letters Patent and said copending application, prompt dissipation of heat from a valve stem into the engine mass, or into the cooling media of an internal combustion engine is accomplished by maintaining contacting wall portions of the valve stem and its supporting guide in radially yielding or resilient metal to metal contact with each other. In my above identified Letters Patent, this is shown as accomplished by providing, in the valve stem, longitudinal slots which intersect each other substantially at the axis of the stem, thus dividing the stem into a plurality of radially yieldable sections, portions of which fit the bore of the guide without the usual radial operating clearance space.

The extent of the contacting area of the stem and guide is increased in the manner set forth in my copending application above identified with a resultant increase in heat dissipating efficiency.

In addition to heat dissipation, the resilient stem eliminates rocking of the valve in the guide, reduces wear, and maintains proper alignment and seating of the valve head on the seat of the engine port.

One of the principal objects of the present invention is to provide one member of a valve stem member and guide member combination, which one member has means rigidly affixed thereto and adapted to maintain radially yielding contact between itself and the other member when the members are associated.

Another object is to provide a valve and guide combination, or one member thereof, such that the resilient guiding of the valve is effected while clearance spaces between the valve stem and guide and coextensive lengthwise of the guide with the guide bore are eliminated or so reduced that passage of air or gases between the stem and guide is eliminated or greatly impeded whereby the combination may be used both for intake and exhaust purposes.

A more specific object is to provide one member of a valve stem member and guide member combination, which one member has a part rigidly connected thereto at one portion and spaced generally radially therefrom at another portion, and the spaced portion being yieldable relative to the remainder of the member in a generally radial direction.

Another specific object is to provide in a valve stem member and guide member combination an interponent which is adapted to be placed between the members and which maintains intimate heat conducting relation with both, and which has radially yieldable portions in contact with at least one of the members for maintaining said contact at all times and under all temperature conditions of the valve.

Other objects and advantages will become apparent from the following specification wherein reference is made to the drawings in which Fig. 1 is a vertical sectional view through a fragment of an internal combustion engine showing a preferred embodiment of a valve and guide combination in which the valve embodies the structure for imparting the principles of the present invention;

Fig. 2 is an enlarged elevation, partly in section, of the valve illustrated in Fig. 1;

Fig. 3 is a development of a sleeve or interponent forming a portion of the valve stem illustrated in Figs. 1 and 2;

Fig. 4 is an enlarged cross-sectional view taken on a plane indicated by the line 4—4 in Fig. 2;

Fig. 5 is a vertical sectional view through a fragment of an internal combustion engine with a modification of a valve and guide combination installed and in which the guide embodies the structure for imparting the principles of the present invention;

Fig. 6 is a side elevation of a sleeve adapted for incorporation in the guide, a fragment of the valve stem being shown therein for clearness in illustration;

Figs. 7 and 8 are enlarged cross sectional views taken on the planes indicated by the lines 7—7 and 8—8, respectively, in Fig. 6;

Fig. 9 is a side elevation of a modification of a valve embodying the principles of the present invention;

Fig. 10 is an enlarged cross-sectional view of the valve illustrated in Fig. 9 and is taken on the plane indicated by the line 10—10 in Fig. 9, and Fig. 11 is a longitudinal sectional view of a modified form of the stem illustrated in Fig. 9.

Referring first to Figs. 1 to 4, there is illustrated a fragment of the block 1 of an internal combustion engine. The block 1 has a valve port 2 and a cooling system, a part of which is a water jacket 3. A valve guide 4 is mounted in the block 1 and supports and guides a valve for reciprocatory movement to effect proper cooperation of the valve head with a seat 5 of the valve port 2. The valve, later to be described, is opened by the usual valve lifter 6 and returned to closed position by the customary return spring 7 which may be interposed between one end of the guide and a suitable keeper 8 secured on the valve stem by a split collar 9.

The valve which cooperates with the guide 4 and port 2 comprises essentially a head 10 and stem 11, the head having a seat 12 complementary to the seat 5. Between predetermined limits intermediate its ends, the stem 11 has a reduced diameter portion of which, in the illustrative example, the limit nearer the head may be defined by a slight circumferential channel 13 and the limit nearer the butt end of the stem may be defined by a similar channel 14. The channel 13 preferably is positioned on the stem so as to be adjacent or slightly above the upper end of the effective bore of the valve guide when the valve is in open position, and the channel 14 preferably is positioned so as to be a substantial distance below the opposite end of the valve guide bore in all positions of the valve.

Mounted on the reduced diameter portion of the stem 11 and forming part of the stem 11 are means for maintaining a direct and continuous metal path for passage of heat from the valve stem 11 into the valve guide 4. In the form illustrated, this means comprises a sleeve or interponent 15 of relatively thin metal such as steel, copper, or other metal of good heat conducting qualities. When the sleeve is incorporated in the valve as a part of the valve, it is securely fastened to the valve stem 11 so that substantial surface portions of the stem 11 and of the sleeve or interponent 15 are in fixed and intimate metal to metal contact, particularly those portions of the interponent nearest the head of the valve. The normal thickness of the sleeve is preferably such that when the sleeve is incorporated in the stem the reduced diameter portion on the stem is restored to its original outside diameter, except at the resilient portions, as hereinafter set forth, and can fit the guide bore with slight radial clearance. This thickness of the sleeve 15 depends somewhat upon the use to which the valve is to be put. In some instances, such as in the case of a relatively cool operating intake valve, it may be of such thickness that the clearance usually provided between the valve stem and guide bore wall is greatly reduced. When the sleeve 15 is affixed to the valve stem, it is preferably secured in place by spinning it onto the stem and crimping the ends into the channels 13 and 14.

At certain of its surface portions, the sleeve 15 is slit so as to produce a plurality of tongues. In the preferred example, the slits extend longitudinally, as indicated at 17, and at one end of each of certain pairs of longitudinal slits 17 are circumferential slits 18, thus providing a plurality of tongues or fingers 19 which are connected fixedly at one portion to the sleeve, yet are free to flex relative thereto at other portions. The tongues or fingers 19 are distorted outwardly from the normal surfaces of the sleeve, the distortion preferably being an amount less than the normal thickness of the metal of which the sleeve is formed.

In the form illustrated, the tongues 19 are elongated longitudinally of the valve stem, although similar tongues elongated circumferentially of the stem may be used. Also, the portion connecting the tongues and sleeve may be at the ends of the tongues, as illustrated, or at the sides of the tongues.

The tongues 19 are of such resiliency and so related to the stem that when the stem is in the guide, the tongues yield radially and effect radially yielding or resilient contact with the wall defining the bore of the guide. The normal radius of curvature of the outer surfaces of the tongues is preferably exactly the same as the radius of curvature of the guide bore wall, so that when the valve is in operating position in the guide, substantially the entire outer surface of each tongue is in engagement with the wall of the guide bore. The tongues 19, when elongated longitudinally of the stem, preferably are arranged in two circumferentially extending rows, these rows being spaced apart longitudinally of the stem from each other and arranged so that radially yieldable or resilient support for the stem is assured at the end portions of the guide bore where the greatest radial displacement of the stem, due to rocking, would otherwise occur and, in fact, normally occurs in the case of the ordinary valve. The tongues of one row preferably are staggered circumferentially of the stem relative to the tongues of the other row. Also each tongue is preferably positioned so that each rigid portion of the sleeve lies diametrically opposite from one of the tongues, thus reducing the possibility of causing contact with the guide of diametrically opposite stem surfaces which cannot yield. The sleeve 15 preferably is positioned on the valve stem with those ends of the tongues which are connected to the sleeve positioned toward the valve head so that the shortest possible paths for heat conduction from the head into the tongues and thence into the guide are provided, and also so that any gases tending to enter the guide are precluded from passing directly between the tongues and the stem 11.

However, since in operating position, the outer surfaces of the tongues usually almost form a continuation of the normal outer surfaces of the sleeve 15, very little passage of gases, if any, is possible regardless of which ends of the tongues are nearest the head.

With this structure, heat entering the stem 11 from the head of the valve flows rapidly into the sleeve due to the large area of the sleeve in permanent and direct contact with the stem at the upper end of the sleeve. This heat is then dissipated rapidly from the stem through the tongues 19 which are in direct metal to metal resilient contact with the guide walls.

When the tongues are arranged in two circumferential series, one series being spaced longitudinally of the stem from the other, as illustrated, and the tongues of one series are offset or staggered circumferentially of the valve stem with respect to the tongues of the other series, no direct clearance passage between the stem and guide for the full length of the guide bore exists.

It has been found that most of the heat is dissipated by the tongues 19 which are nearest the head, but both sets of tongues are particularly desirable to prevent rocking of the stem in the guide. For this latter purpose, it is preferred that resilient portions of the sleeve be positioned at least so as to engage the wall of the guide bore adjacent the ends of the guide bore though resilient portions also may engage the guide bore at locations intermediate the ends of the bore. By locating the resilient portions adjacent the ends of the guide bore, the shocks tending to cause lateral or radial rocking of the stem are reduced to a minimum.

In order further to reduce the possibility of entry of gases between the sleeve portion and the reduced diameter portion of the valve stem 11, the end of the sleeve 15 nearest the valve head is provided with a lapped joint which may be produced by forming a notch 20 in one longitudinal margin of the sleeve 15 and a cooperating tongue 21 in the opposite margin for engagement with the notch 20 when the sleeve is secured in place. Thus, the composite stem performs the heat dissipating, aligning, and other functions of the valve described in my said patent and also eliminates or reduces the possibility of passage of air or gases through the guide. Consequently, the valve may be used for intake purposes as well as exhaust purposes.

Though preferably the provision for radially yielding contact between the guide and stem is by the resilient means secured on and forming part of the stem, this function may be by a similar means incorporated as a part of the guide. Such a structure is illustrated in Figs. 5 to 8, inclusive, wherein the guide 24 is provided with an internal sleeve 25 having an end flange 26 against which the return spring 27 of the valve abuts. The guide sleeve 25 likewise is provided with a plurality of tongues 29 corresponding in form and function to the tongues 19. These tongues resiliently engage the stem 30 of the valve and cooperate therewith to hold the valve in proper axial alignment, eliminate rocking, and dissipate heat from the stem 30 into the guide 24, and thence into the engine mass or such cooling means as are provided for the engine generally.

In such an installation, it is unnecessary to undercut the valve stem at any portion thereof if the valve guide bore is made slightly oversize so that when the sleeve is installed therein, it accommodates the normal diameter valve stem with the usual radial clearance except at the tongues 29 which are in direct and yielding contact with the stem. In both the form illustrated in Figs. 1 to 5 and the form illustrated in Figs. 5 to 8, the radius of curvature of the surfaces of the tongues is the same as the radius of curvature of the wall of the member which they slidably and resiliently engage.

Referring next to Figs. 9 to 11, inclusive, a modification of the structure illustrated in Fig. 1 is illustrated. In this modification, the valve stem member 31 or the valve guide member, if desired, is provided with a sleeve 32 which is secured to the stem member 31, as illustrated in Fig. 10, or to the guide member. The means of incorporating the sleeve 32 as part of the stem member 31 is by providing in the stem member 31 a suitable longitudinal slot 33 which receives a marginal flange 34 of the sleeve 32. As in the case of the tongues heretofore described, the interponent or sleeve 32 is incorporated as a part of the stem or part of the guide with sufficient clearance radially between it and the member by which it is carried to permit radial expansion and compression in an amount greater than the maximum expansion or compression that can occur. In all forms, even at maximum expansion, the stem is resiliently supported and held in alignment in the guide.

Thus the resilient expansion and contraction of the sleeve 32, whether it is incorporated in the guide or on the stem affords radially yielding metal to metal contact paths for the dissipation of heat from the stem into the guide, while at the same time it maintains the valve stem in coaxial alignment with the guide and valve port.

The sleeve is preferably such that when the valve is heated to some extent, the clearance between the sleeve 31 and the member which it slidably engages is almost eliminated so that coaxial alignment, and radially yielding contact for heat dissipation, are combined.

Further higher efficiency in dissipation of heat can be obtained by providing in the valve stem a central bore. As illustrated in Fig. 11, the valve stem portion 36 is provided with a central bore 37 which constrains the heat entering from the head to flow along the outer surfaces of the stem portion 36 rather than along the axis or central portion. Thus, the heat passes more rapidly to the resilient sleeve and therethrough to the valve guide.

If desired, the interponent may be provided with resilient tongues or fingers which extend both outwardly and inwardly from its normal surface so that some of the resilient tongues engage the valve stem and some engage the wall of the bore of the guide, instead of the interponent being fixedly secured to one or the other of the guide or stem. While this is effective for resiliently supporting the stem in the guide, and dissipating heat, it is less desirable in that spaces between the interponent and the guide wall and stem are such that they may permit the entry of the heated gases, or air, between the valve stem and guide. The latter type of sleeve which is not connected fixedly to either member, may be held in place by a flange at the lower end abutting the lower end of the guide, the same as in connection with the sleeve illustrated in Figs. 6 to 9, inclusive.

1. One member adapted to be used in combination with another member to form a combined valve stem and valve stem guide, heat conducting metal means in contact with said one member and adapted to lie between the members when the members are assembled, said means having at least one resilient portion which is yieldable generally toward and away from the axis of the member by which it is carried and which is adapted for resilient engagement with the other of said members near the ends of the guide when the members are assembled in the combination.

2. One member adapted to be used in combination with another member to form a combined valve stem and valve stem guide, heat conducting metal means in continuous contact with said one member and adapted to lie between the members when the members are assembled, said means having a resilient portion which is readily yieldable toward and away from the axis of the member by which it is carried and adapted for continuous resilient engagement with the other of said members when the members are assembled in the combination.

3. One member adapted to be used in combination with another member to form a combined valve stem and valve stem guide, heat conducting metal means in fixed and heat conducting contact with said one member and adapted to lie between the members when the members are assembled, said means having a resilient portion which is yieldable generally toward and away from the axis of the member by which it is carried and adapted for resilient engagement with the other of said members when the members are assembled in the combination.

4. In an engine having a port, a valve adapted to open and close said port, said valve comprising a head and stem, guide means for reciprocably supporting said stem, and means for maintaining contacting wall portions of the guide means and the stem in yielding contact with each other for conducting heat from said stem into said guide means, said means comprising a metal sleeve fixed to and forming a part of the stem and having a generally radially yieldable portion in heat conducting contact with the guide.

5. In an engine having a port, a valve adapted to open and close said port, said valve comprising a head and stem member, a guide member for reciprocably supporting said stem member, and means for maintaining contacting wall portions of the members in yielding contact with each other for conducting heat from said stem member into said guide member, said means comprising a metal sleeve fixedly secured to one of the members and having a plurality of generally radially yieldable tongue portions in heat conducting contact with the other member.

6. One member adapted to be used in combination with another member to form a combined valve stem and valve stem guide, said one member having means affixed thereto and elongated axially of the member to which it is affixed and having at least one portion in firm contact with the member to which it is affixed, and another portion radially yieldable toward and away from the member to which said means is affixed and adapted for resilient engagement with the other member of the combination recited.

7. One member adapted to be used in combination with another member to form a combined valve stem and valve stem guide, said one member having radially yieldable tongues spaced radially therefrom and radially yieldable toward and away from the member by which said tongues are carried and adapted for resilient engagement with the other member of the combination recited.

8. One member adapted to be used in combination with another member to form a combined valve stem and valve stem guide, said one member having radially yieldable tongues spaced radially therefrom and radially yieldable toward and away from the member by which said tongues are carried and adapted for resilient engagement with the other member of the combination recited, and said tongues being arranged in circumferential rows, the rows being spaced longitudinally of the stem from each other.

9. One member adapted to be used in combination with another member to form a combined valve stem and valve stem guide, radially yieldable tongue portions on said one member and spaced radially therefrom for yieldably engaging the other member, said tongue portions being arranged in circumferential rows and the rows being spaced longitudinally of the said one member from each other, and the tongue portions of one row being staggered circumferentially of the said one member with respect to the tongue portions of another row.

10. A valve adapted to open and close an engine port, said valve comprising a head and stem, a sleeve embracing the stem and forming a part thereof, said sleeve having tongue portions spaced radially outwardly therefrom for yieldably engaging a guide, and said sleeve being of heat conducting material.

11. A valve adapted to open and close an engine port, said valve comprising a head and stem, a sleeve embracing the stem and forming a part thereof, said sleeve having the portion nearest the valve head in firm juxtaposition with the stem and having tongue portions positioned therebeyond in a direction away from the head and in spaced parallel relation to the stem for yieldably engaging a guide, and said sleeve having portions positioned intermediate the tongue portions circumferentially of the stem in firm face to face juxtaposition with the stem, and said sleeve being of heat conducting material.

12. A valve comprising a head portion and a stem portion, a sleeve embracing part of the stem portion and secured thereon and forming a part thereof, said sleeve having a plurality of portions in firm face to face juxtaposition with the stem portion and having a plurality of tongue portions spaced radially outwardly therefrom for yieldably engaging guiding walls of a valve guide.

13. One member adapted to be used in combination with another member to form a combined valve stem and valve stem guide, a sleeve secured on said one member and forming a part thereof, said sleeve having a plurality of portions in firm face to face juxtaposition with the said one member and having a plurality of tongue portions spaced radially outwardly therefrom and extending longitudinally of the said one member for yieldably engaging the other member when the members are assembled in the combination.

14. In a valve and guide combination, a valve adapted to open and close an engine port and comprising a head and stem member, a guide member, a sleeve interposed between the members and approximately coextensive axially with the guide member, said sleeve having portions in face to face juxtaposition with the members, said portions being radially yieldable relative to each other.

WILLIAM H. TAYLOR.